US006887554B2

(12) United States Patent
Widlund et al.

(10) Patent No.: US 6,887,554 B2
(45) Date of Patent: May 3, 2005

(54) MULTI-PRODUCT

(75) Inventors: Urban Widlund, Pixbo (SE); Emmanuelle Morin, Paris (FR); Anders Gustafsson, Billdal (SE)

(73) Assignee: SCA Hygiene Products GmbH, Mannheim (DE)

( * ) Notice: Subject to any disclaimer, the term of this patent is extended or adjusted under 35 U.S.C. 154(b) by 175 days.

(21) Appl. No.: 10/189,450

(22) Filed: Jul. 8, 2002

(65) Prior Publication Data

US 2003/0021950 A1 Jan. 30, 2003

Related U.S. Application Data

(60) Provisional application No. 60/303,149, filed on Jul. 6, 2001.

(51) Int. Cl.[7] .................................................. B32B 3/04

(52) U.S. Cl. .......................... 428/121; 428/53; 428/68; 428/72; 428/74; 428/76; 428/126; 428/130; 442/327; 442/381; 442/389; 442/412; 229/105; 229/117.01; 493/231; 493/243; 493/405; 493/409

(58) Field of Search ................................ 442/327, 381, 442/389, 412; 428/68, 72, 74, 76, 53, 126, 130–131, 121; 493/231, 243, 405, 409

(56) References Cited

U.S. PATENT DOCUMENTS 3,326,365 A 6/1967 Neureither et al.
3,619,816 A 11/1971 Cowen
4,043,855 A 8/1977 Patin
4,100,017 A * 7/1978 Flautt, Jr. .................. 428/154
4,166,551 A 9/1979 Stiros
4,582,743 A 4/1986 Bähring
4,681,240 A 7/1987 Wyant
4,836,410 A 6/1989 Mastrobuoni
4,859,518 A 8/1989 Schutz
5,023,126 A 6/1991 Stevens et al.

FOREIGN PATENT DOCUMENTS

EP 0 399 275 A1 11/1990
FR 2 481 243 10/1981
GB 2 250 729 A 6/1992
TW 388390 4/2000
TW 441573 6/2001
WO 96/26664 9/1996
WO 98/37794 9/1998
WO WO 98/37794 * 9/1998 ........... A47G/11/00

* cited by examiner

*Primary Examiner*—Terrel Morris
*Assistant Examiner*—Norca L. Torres
(74) *Attorney, Agent, or Firm*—Young & Thompson

(57) ABSTRACT

A multi-ply tissue product has several plies (2, 3, 4, 5) The multi-ply configuration is made by at least one folding (a; b; c) of at least one ply sheet (P) of tissue material in order to reduce the possibilities of delamination and to make the product flexible simultaneously.

14 Claims, 1 Drawing Sheet

MULTI-PRODUCT

TECHNICAL FIELD

The invention relates to tissue or non-woven products, especially comprising several plies and suitable as hygiene or wiping products primarily including all kind of dry-creped tissue paper, wet-creped paper and cellulose or pulp wadding or all kinds of non-wovens, or combinations, laminates or mixtures thereof. Typical properties of these hygiene and wiping products include the ready ability to absorb tensile stress energy, their drapability, good textile-like flexibility, properties which are frequently referred to as bulk softness, a high surface softness, and a high specific volume with a perceptible thickness. As high a liquid absorbency as possible and, depending on the application, a suitable wet and dry strength as well as an appealable visual appearance of the outer product surface is desired. These properties, among others, allow these hygiene and wiping products to be used, for example, as cleaning wipes such as paper or non-woven wipes, windscreen cleaning wipes, industrial wipes, kitchen paper, or the like; as sanitary products such as for example toilet paper, paper or non-woven handkerchiefs, household towels, towels, and the like; as cosmetic wipes such as for example facials and as serviettes or napkins, just to mention some of the products that can be used. Furthermore, the hygiene and wiping products can be dry, moist, wet or pre-treated in any manner. In addition, the hygiene and wiping products may be folded, interleaved or individually placed, stacked or rolled, connected or not, in any suitable manner.

Due to the above description, the products can be used for personal and household use as well as commercial and industrial use. They are adapted to absorb fluids, for decorative purposes, for packaging or even just as supporting material, as is common for example in medical practices or in hospitals. In terms of their wide variety, hygiene and wiping products are now considered to be everyday products.

A tissue paper is defined as a soft absorbent paper having a basis weight below 65 g/m$^2$ and typically between 10 and 50 g/m$^2$. Its density is typically below 0.6 g/cm$^3$, preferably below 0.30 g/cm$^3$ and more preferably between 0.08 and 0.20 g/cm$^3$. Moist tissue paper webs are usually dried by the so-called Yankee drying, the through air drying or the impulse drying method. The fibers contained in the tissue paper are mainly pulp fibers from chemical pulp (e.g. Kraft sulfite and sulfate pulps), mechanical pulp (e.g. ground wood), thermo mechanical pulp, chemo-mechanical pulp and/or chemo-thermo mechanical pulp (CTMP). Pulps derived from both deciduous (hardwood) and coniferous (softwood) can also be used. The fibers may also be or include recycled fibers, which may contain any or all of the above categories as well as other non-fibrous materials such as fillers and adhesives used to facilitate the original paper making. The tissue paper may also contain other types of fibers enhancing, for instance, strength, absorption, smoothness or softness of the paper. Tissue paper may even be converted to the final tissue product in many ways, for example, by embossing or laminating it into a multi-ply product, rolled or folded.

The term non-woven (ISO 9092, DIN EN 29092) is applied to a wide range of products which, in terms of their properties, are located between those of paper (cf. DIN 6730, May 1996) and cardboard (DIN 6730) on the one hand, and textiles on the other hand. As regards non-woven a large number of extremely varied production processes are used, such as the air-laid and spun-laced techniques as well as wet-laid techniques. The non- woven includes mats, non-woven fabrics and finished products made thereof. Non-wovens may also be called textile-like composite materials, which represent flexible porous fabrics that are not produced by the classic methods of weaving warp and weft or by looping. In fact, non-wovens are produced by intertwining, cohesive or adhesive bonding of fibres, or a combination thereof. The non-woven material can be formed of natural fibres, such as cellulose or cotton fibres, but can also consist of synthetic fibres, such as Polyethylene (PE), polypropylene (PP), polyurethane (PU), polyester, nylon or regenerated cellulose, or a mix of different fibres. The fibres may, for example, be present in the form of endless fibres of pre-fabricated fibres of a finite length, as synthetic fibres produced in situ, or in the form of staple fibres. The non-wovens according to the invention may thus consist of mixtures of synthetic and cellulose fibrous material, e.g. natural vegetable fibres (see ISO 9092, DIN EN 29092).

BACKGROUND ART

The traditional way to make a wipe consisting of several plies is to put each single ply on top of each other and to provide a bonding between the plies which can be made by chemical or mechanical bonding, e.g. glueing or embossing or edge-embossing. This means that there are several possibilities for the wipe to delaminate, because a bonding which may delaminate exists between each of the single plies.

WO 98/37794 discloses a rolled and folded napkin which facilitates the withdrawal of napkins from a dispenser and which allows an effective storage. The napkin is intended to be unfolded for use. Dispensing problems are also solved by GB-2250729 A for dispensing from a stack of towels. Similarly, WO 96/26664 relates to dispensing problems. Special folds are made only for this purpose.

U.S. Pat. No. 5,023,126 A describes composite towels and a method for making composite towels, comprising of a composite product including one surface formed by smooth tissue and an opposite surface formed by an absorbent dry-formed fabric product. The connection between the layer of fibre material and the layer of tissue on a forming wire is made by a binder. Then, the thus achieved product is folded in order to obtain a towel of a type which can be dispensed from a towel dispenser with a facility of conventionally folded towels.

U.S. Pat. No. 4,582,743 A describes a toilet paper which has greater thickness in its central area and at the edges in order to give it the required wet strength. This greater thickness is achieved by folding a single-ply paper sheet in accordance with the drawings. Folding is only made for this purpose.

U.S. Pat. No. 4,043,855 A describes a multi-layer article and a process and apparatus for its manufacture. This multi-layer article is made such that it comprises at least two thicknesses, obtained by folding a single continuous web or strip of said material. The overlapping portions (by folding) are fixed one on top of the other so as to form a multi-layer web or strip. Adhesive means are applied to the strip in order to fix the loop portions being overlapped relatively one to another.

DISCLOSURE OF THE INVENTION

Technical Problem

When creating a wipe that consists of several tissue plies, a ply-bonding which makes the wipe feel like one wipe and not delaminate is of importance. To prevent delamination, different more or less complicated ways of so-called "ply-bonding" are used. But the stronger the ply-bonding is, the less flexible the wipe becomes. Lack of flexibility is of course a problem.

Solution of the Technical Problem

In a multi-ply tissue product having several plies, said multi-ply configuration is made by at least one folding of at least one ply sheet of tissue material. By this folding, there are less possibilities for delamination because a bonding is avoided at the folded ends or edges. The folding is made to achieve a thicker and more absorbent product with more than one ply. The product is to be used in its folded shape. There is a decreased stiffness and an increased bulk present. By avoiding glue, there is any toxic behaviour avoided and ply bonding is improved, when coated products are used, especially products coated with lotions.

The reduction of possibilities of delamination is increased for more plies when at least one ply sheet is folded at least twice, the first fold being made starting from a first ply to perform a double-ply configuration, and the second fold is made starting from the second ply around the free end of the first ply opposite to the folded edge of the first ply such that a third ply is present being located on the side of the first ply being opposite to the side where the second ply is located. Having at least three plies, there is only one possibility of delamination, especially when bonding is made along the free edge of the ply sheet by glue or other means. Such a product or wipe is simultaneously much more flexible and has a better drapability.

According to a further development of the invention, a third fold can be made such that a therewith formed fourth ply is present on the side of the second ply being opposite to the side where the first ply is located.

Alternately, two ply sheets are together folded in the same manner, wherein the two ply sheets may be of different material.

As a further improvement, there may be enclosed another material or substance between at least two plies, which material or substance may be advantageous for the wiping effect.

Bonding can be made between plies at least at the outer free end of the at least one folded ply sheet and bonding can be made my adhesive or embossing or edge-embossing (knurling).

The product can furthermore also be built up with different materials or materials with different functional zones.

In particular, the product may be a tissue or non-woven product being discontinuous or continuous. In the case of a product as a continuous web, this may be divided into sub-parts by e.g. perforations. Such a product may be folded lengthwise such that a continuous folded web is present, e.g. z-folded. All in all, the paper product can be present within a roll such that ply-bonding is improved and finalised within the roll by web contact maintaining the folding. In particular, the product is present as a toilet paper or as a household or kitchen towel.

DETAILED DESCRIPTION OF THE INVENTION

When "tissue product" or "tissue ply" is mentioned in this application, then a tissue paper material is meant as defined above.

Figure 1:
Fig. 1 Prior Art
FIG. 1 shows a four-ply tissue product according to the prior art.

According to FIG. 1, the tissue product is achieved by combining for instance four single plies 1 or ply sheets being ply-bonded. There exist at least three possibilities of delamination when the tissue product for instance is used as a wipe. However, a strong ply-bonding for avoiding delamination would lead to a relatively stiff product having relatively low flexibility and poor drapability.

Figure 2A:
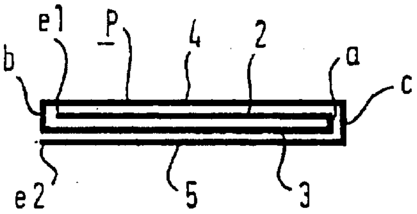
FIGS. 2*a* and *b* show a one-ply sheet-multi-ply tissue product according to the invention.
Figure 2B:
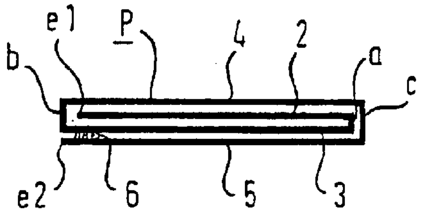

A similar product with the same amount of plies is shown in FIG. 2*a* and FIG. 2*b* having a first ply 2, a second ply 3, a third ply 4 and a fourth ply 5. The single ply-sheet P is folded at three points or locations a, b and c such that one free end e1 is enclosed and another free end e2 is open. For instance there can exist a glued area 6 for bonding the fourth ply 5 and the second ply 3 (FIG. 2*b*–FIG. 4*b*). Also additional bondings can certainly be made at preferred locations.

Figure 3A:
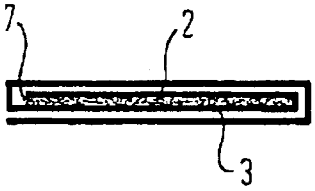
FIGS. 3*a* and *b* show a similar product according to FIG. 2, however, with an enclosed material.
Figure 3B:
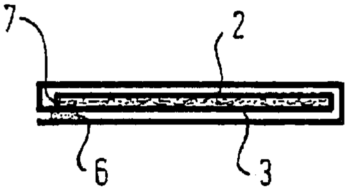

The same configuration is illustrated in FIG. 3*a* and FIG. 3*b*, however, there is an additional material or substance 7 enclosed between the first ply 2 and the second ply 3.

Figure 4A:
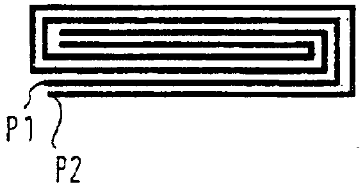
FIGS. 4*a* and *b* show a two-ply sheet-multi-ply tissue product.
Figure 4B:
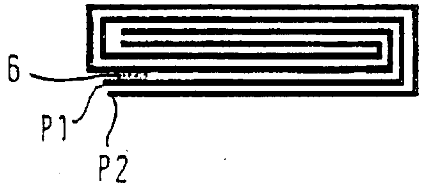

In the embodiment according to FIG. 4*a* and FIG. 4*b*, a similar configuration is illustrated as in FIG. 2*a* and FIG. 2*b*. However, there is present a two-ply-sheet configuration having the ply sheets P1 and P2. Such a tissue product, e.g. a wipe, can be built up with different materials or materials with different functional zones.

In principle, the folding illustrated in the drawings may be crosswise foldings. However, these foldings can also be longitudinal foldings in connection with a longitudinal product. In this respect, the product can be a continuously folded web, e.g. z-folded, and this continuously folded web can be wound as a roll, especially a toilet paper or a household (kitchen) towel. A continuous web may be divided into sub-parts by e.g. perforations.

In a roll the longitudinal folding as ply-bonding is fixed, especially at the free end being not bonded as illustrated in FIGS. 2*a*, 3*a* and 4*a*. Such a roll is not illustrated, however, is understandable from kitchen towel rolls or toilet paper rolls as on the market.

What is claimed is:

1. Multi-ply product having several plies, the multi-ply configuration being made by at least one folding of at least one ply sheet of tissue material, wherein at least one ply sheet is folded at least three times, a first fold being made starting from a first ply to perform a double ply configuration, a second fold being made starting from the second ply around a free end of the first ply opposite to the folded edge of the first ply such that a third ply is present and located on the side of the first ply opposite to the side where the second ply is located, and a third fold being made such that a fourth ply is present on the side of the second ply opposite to the side where the first ply is located.

2. The multi-ply product according to claim 1, wherein two ply sheets are together folded in the same manner.

3. The multi-ply product according to claim 1, wherein said folding is a lengthwise folding.

4. The multi-ply product according to claim 2, wherein the two ply sheets are of different material.

5. The multi-ply product according to claim 1, wherein another material or substance is enclosed between at least two plies.

6. The multi-ply product according to claim 1, wherein additionally a bonding is made between plies at least at the outer free end of the at least one folded ply sheet.

7. The multi-ply product according to claim 6, wherein said bonding is made by adhesive or embossing or edge-embossing.

8. The multi-ply product according to claim 1, wherein the product is a tissue product.

9. The multi-ply product according to claim 1, wherein the product is a non-woven product.

10. The multi-ply product according to claim 1, wherein the product is a continuously folded web or wound to a roll.

11. The multi-ply product according to claim 1, wherein the product is a continuous product.

12. The multi-ply product according to claim 11, wherein the continuous product is divided into sub-parts.

13. The multi-ply product according to claim 1, wherein the product is a toilet paper or a kitchen towel.

14. Method of making a multi-ply tissue product having a multi-ply configuration, which comprises:

providing at least one ply sheet of tissue material;

folding said at least one ply sheet of tissue material at least three times;

wherein a first fold is made starting from a first ply to perform a double ply configuration; a second fold is made starting from the second ply around a free end of the first ply opposite to the folded edge of the first ply such that a third ply is present and located on the side of the first ply opposite to the side where the second ply is located; and a third fold is made such that a fourth ply is present on the side of the second ply opposite to the side where the first ply is located.

* * * * *